United States Patent [19]

Hanawa et al.

[11] Patent Number: 5,375,215
[45] Date of Patent: Dec. 20, 1994

[54] MULTIPROCESSOR SYSTEM HAVING SHARED MEMORY DIVIDED INTO A PLURALITY OF BANKS WITH ACCESS QUEUES CORRESPONDING TO EACH BANK

[75] Inventors: Makoto Hanawa, Kodaira; Tadahiko Nishimukai, Sagamihara; Osamu Nishii, Kokubunji; Makoto Suzuki, Niiza, all of Japan

[73] Assignee: Hitachi, Ltd., Tokyo, Japan

[21] Appl. No.: 784,546

[22] Filed: Oct. 29, 1991

[30] Foreign Application Priority Data

Nov. 9, 1990 [JP] Japan .................. 2-302408

[51] Int. Cl.5 .................... G06F 13/36; G06F 9/40
[52] U.S. Cl. .................... 395/425; 364/228.1; 364/229.2; 364/230.1; 364/238.6; 364/240; 364/242.3; 364/244.3; 364/254.5; 364/255.1; 364/941.4; 364/942.2; 364/942.3; 364/955; 364/957.6
[58] Field of Search .................... 395/425; 364/DIG. 1 MS File

[56] References Cited

U.S. PATENT DOCUMENTS

| 4,992,930 | 2/1991 | Gilfeather et al. | 395/425 |
| 5,023,776 | 6/1991 | Gregor | 364/DIG. 1 |
| 5,317,726 | 5/1994 | Horst | 395/575 |

*Primary Examiner*—Joseph L. Dixon
*Assistant Examiner*—B. James Peikari
*Attorney, Agent, or Firm*—Fay, Sharpe, Beall, Fagan, Minnich & McKee

[57] ABSTRACT

A multiprocessor system of the present invention has an address bus, a data bus, first and second processors, four access queues, and a shared memory divided into four banks. The four access queues are constituted by first-in first-out memories for buffering a plurality of access-request addresses transmitted through the address bus. Even if continuous access requests are addressed to one bank of the shared memory, a succeeding access request need not wait for a previous access request to be finished. Accordingly, the throughput of the system can be improved greatly.

4 Claims, 5 Drawing Sheets

MULTIPROCESSOR SYSTEM HAVING SHARED MEMORY DIVIDED INTO A PLURALITY OF BANKS WITH ACCESS QUEUES CORRESPONDING TO EACH BANK

BACKGROUND OF THE INVENTION

1. Field of the Invention

The present invention relates to a multiprocessor system in which a plurality of processors are connected to a shared memory through an address bus and a data bus.

2. Description of the Prior Art

A multiprocessor using a shared memory composed of only a single bank in memory access is known heretofore as described in "Report on Computer System Research", CPSY90-4, The Institute of Electronics, Information and Communication Engineers of Japan, Apr. 20, 1990, pp. 25–32, (hereinafter referred to as "first reference").

The first reference has proposed a split bus in which a system bus is once released after a sender unit such as a processor transmits an order (address/ data) and a receiver unit acquires the ownership of the system bus to answer the sender unit when it has becomes ready for answering.

Further, the first reference has proposed provision of a system bus interface control circuit (communication buffer) for storing a plurality of orders or answers under the consideration that such a plurality of orders may be given from a plurality of units such as processors, memories, input-output devices, and the like. For example, the system bus interface control circuit is provided in a bus input-output portion of a processor unit.

According to the proposed system, different data transfer such as address transfer from a unit C to a unit B can be executed in a time space between address transfer from a unit A to the unit B and data transfer from the unit B to the unit A.

As a result, the occupation of the shared system bus by one unit for a long time can be prevented, so that a high transfer throughput in this type of multiprocessor system can be expected.

On the other hand, a memory access pipeline system in which memory access can be made without the necessity of waiting for completion of the previous memory access is disclosed in "Computer Architecture", The OHMsha Ltd., Aug. 30, 1988, pp. 179–184, (hereinafter referred to as "second reference"). In the disclosed system, the memory is divided into a plurality of banks. Further, an access queue and a data queue are added to the memory in order to buffer access requests inputted successively and read data outputted successively.

According to the disclosed system, high-speed memory access can be attained because a succeeding request need not wait completion of a preceding request if these two access requests are addressed to different memory banks, respectively.

Further, the second reference discloses a hardware system for pipeline access to a memory divided into a plurality of banks. As the hardware system, proposed is a pipeline access system having a plurality of memory address resisters and a plurality of data latches corresponding to the plurality of banks.

SUMMARY OF THE INVENTION

In the related art technique described in the first reference, however, the system is a system in which the shared memory has only one bank and in which both address and data are transferred on the system bus in a multiplexing and time sharing fashion. In this case, therefore, it has been proved through the investigation by the inventors of this application that the throughput in access from a plurality of processors to the shared memory is poor.

In the related art technique described in the second reference, only one memory address register is provided correspondingly to one memory bank. Accordingly, if adjacent access requests from processors are concentrated to one memory bank, a succeeding access request for the same bank needs to wait for completion of a preceding access request. In this case, it has been proved through the investigation by the inventors of this application that the throughput in access in this case is lowered.

It is therefore an object of the present invention to provide a multiprocessor system in which the throughput in access from a plurality of processors to a shared memory is improved and in which a succeeding access request needs not to wait for completion of a preceding access request even if adjacent access requests from processors are concentrated to one and the same bank of a shared memory.

A typical aspect of the present invention disclosed in this specification is as follows.

That is, the multiprocessor system of the present invention has an address bus (170), a data bus (180), a plurality of processors (110 and 120) which are connected to both the address bus (170) and the data bus (180) and serve to send access request addresses to the address bus (170), a plurality of access queues (135, 145, 155 and 165) which are connected to both the address bus (170) and the data bus (180), and a shared memory divided into a plurality of banks (130, 140, 150 and 160) respectively corresponding to the plurality of access queues (135, 145, 155 and 165). The plurality of access queues (135, 145, 155 and 165) are constituted by first-in first-out (FIFO) memories for buffering a plurality of access-request addresses (410) transmitted through the address bus (170).

According to a preferred embodiment of the present invention:

whenever the processors send the access-request addresses to the address bus, the plurality of processors send processor identification numbers and access-request read/write signals to the address bus;

the first-in first-out memories constituting the plurality of access queues further buffer the access-request read/write signals, the access-request processor identification numbers and write data of write access-request; and whenever one of the banks of the shared memory sends data to the data bus, a corresponding one of the first-in first-out memories sends a buffered processor identification number to the data bus.

According to another preferred embodiment of the present invention, each of the plurality of processors has a first circuit for holding a processor identification number sent to the address bus, and a second circuit for comparing the processor identification number sent from the one first-in first-out memory to the data bus with the processor identification number stored in the first circuit to thereby give an instruction to latch the data on the data bus into the processor in the case where the two processor identification numbers coincide with each other.

According to a specific embodiment of the present invention, the system further comprises a first arbiter which is connected to the address bus and which serves to decide the ownership of the address bus in response to the request on the address bus, and a second arbiter which is connected to the data bus and which serves to decide the ownership of the data bus in response to the request on the data bus.

According to the aforementioned typical embodiment of the invention, because the shared memory is divided into a plurality of banks and because a separate bus system in which the address bus and the data bus are physically separated from each other is employed, the throughput in access from the plurality of processors to the shared memory divided into the plurality of banks can be improved greatly.

Further, because data transfers between the banks of the shared memory and the processors are successively executed after the ownership of the data bus is acquired by first-in first-out scheme with respect to a plurality of shared memory access request addresses buffered in the FIFO memory, a succeeding access request need not wait for completion of data transfer in response to a preceding access request even if these two access requests are addressed successively to the same bank of the shared memory. Accordingly, the throughput of the system as to access to one memory bank can be improved greatly.

According to the aforementioned more preferred embodiment of the invention, the processor ID number is assigned in advance for each of the plurality of processors which access the shared bus, and the ID number is outputted simultaneously with the sending of the address so that the data reception can be controlled on the basis of this ID number. Accordingly, the confusion of data among the processors can be prevented even if a plurality of access requests are buffered on the shared memory side.

According to the aforementioned specific embodiment of the invention, the data bus and address bus are provided with the arbiter circuits independently used to decide the ownership of the data bus and the ownership of the address bus respectively. Accordingly, not only a user of the data bus can be decided independently of the address bus but also read data can be transferred by using only the data bus independently of the address bus.

DESCRIPTION OF THE PREFERRED EMBODIMENTS

Embodiments of the present invention will be described in detail hereunder with reference to the drawings.

Figure 1:
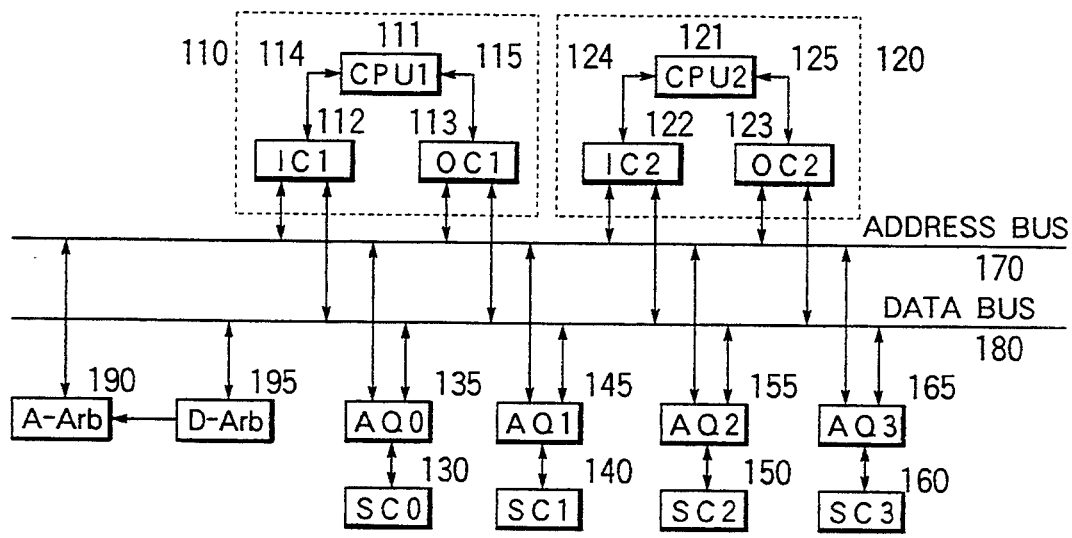
FIG. 1 is a block diagram showing the configuration of a multiprocessor system as an embodiment of the present invention.

FIG. 1 is a block diagram showing the configuration of a multiprocessor system as an embodiment of the present invention.

System Outline

The multiprocessor system shown in FIG. 1 as an embodiment of the present invention has an address bus 170, a data bus 180, first and second processors 110 and 120 which are connected to both the address bus 170 and the data bus 180 and which serve to send access-request addresses to the address bus 170, four access queues 135, 145, 155 and 165 which are connected to both the address bus 170 and the data bus 180, and a shared memory divided into four banks 130, 140, 150 and 160 corresponding to the four access queues 135, 145, 155 and 165. The respective four access queues 135, 145, 155 and 165 are constituted by first-in first-out (FIFO) memories for buffering the access-request addresses transmitted through the address bus 170.

In short, the two processor elements 110 and 120 are connected to each other through the memory divided into the four banks 130, 140, 150 and 160, the address bus 170 and the data bus 180, and further through the four access queues 135, 145, 155 and 165 constituted by FIFO memories.

Because the shared memory is divided into the plurality of banks 130, 140, 150 and 160, and because a separate bus system in which the address bus 170 and the data bus 180 are physically separated from each other is employed, the throughput for access from the plurality of processors 110 and 120 to the shared memory divided into the plurality of banks can be improved greatly.

With respect to the access-request addresses (to the banks of the shared memory 130, 140, 150 and 160) buffered by the four access queues 135, 145, 155 and 165 constituted by FIFO memories, data transfers between the banks of the shared memory 130, 140, 150 and 160 and the processors 110 and 120 are successively performed after the ownership of the data bus is acquired by first-in first-out scheme. Even if two adjacent access requests are successively to the same bank, a succeeding access request need not wait for completion of the data transfer in accordance with a preceding access request. Accordingly, the throughput of the system can be improved greatly.

Constituent members of the processor system of FIG. 1 will be described in detail hereunder.

Configuration of Processor Element (PE)

The processor element 110 has a central processing unit CPU1 111, an instruction cache IC1 112, an operand cache OC1 113, an instruction bus 114 and an operand bus 115, which are connected as shown in FIG. 1.

Instruction Cache of PE

The instruction cache IC1 112 is searched in accordance with an instruction fetch request address from the CPU1 111 to thereby judge whether a copy of a corresponding instruction data exists in the instruction cache IC1 112.

When the requested instruction exists (hit) in the instruction cache, the instruction data is read from the instruction cache IC1 112 and transferred to the CPU1 111 through the instruction bus 114 without any access to the banks of the shared memory 130, 140, 150 and 160 as external devices of the PE.

When the copy of the instruction data corresponding to the instruction fetch request from the central processing unit CPU1 111 does not exist (missing) in the instruction cache IC1 112, the instruction cache IC1 112 reads corresponding data through access to the external memory banks 130, 140, 150 and 160 to store the data therein and, at the same time, transfer the data to the central processing unit CPU1 111 through the instruction bus 114.

The central processing unit CPU1 111 decodes, the instruction data read from the instruction cache IC1 112 or the external memory banks 130, 140, 150 and 160 and performs the execution of the instruction on the basis of the instruction data.

Operand Cache of PE

The operand cache OC1 113 is searched on the basis of an operand access request address from the CPU1 111 in the same manner as in the instruction cache IC1 112 to thereby judge whether a copy of a corresponding operand data exists in the operand cache OC1 113.

When the requested operand data exists in the operand cache, the operand data is read from the operand cache OC1 113 and transferred to the CPU1 111 through the operand bus 115 without any access to the shared memory banks 130, 140, 150 and 160 as external devices of the PE.

When the copy of the data corresponding to the operand access request from the central processing unit CPU1 111 does not exist (missing) in the operand cache OC1 113, the operand cache OC1 113 reads a corresponding data through access to the external memory banks 130, 140, 150 and 160 to store the data therein and, at the same time, transfer the data to the central processing unit CPU1 111 through the operand bus 115.

The central processing unit CPU1 111 uses, the data read from the operand cache OC1 113 or the external memory banks 130, 140, 150 and 160 and performs the execution of the instruction.

Similar to the processor element 110, the processor element 120 has a central processing unit CPU2 121, an instruction cache IC2 122, an operand cache OC2 123, an instruction bus 124 and an operand bus 125 which are connected as shown in FIG. 1. The operation of the processor element 120 is the same as that of the processor element 110.

Shared Memory and Access Queues

The shared memory is divided into the four banks 130, 140, 150 and 160 which are connected to the processor elements 110 and 120 through the access queues 135, 145, 155 and 165, the address bus 170 and the data bus 180.

The access queues 135, 145, 155 and 165 are constituted by first-in first-out (FIFO) buffers for latching memory access requests from the instruction caches IC1 112 and IC2 122 and the operand caches OC1 113 and OC2 123 of the processor elements 110 and 120.

Bus Arbiter

Each of the arbiters 190 and 195 is an arbitration circuit for deciding the ownership of the address bus 170 and the data bus 180.

Configuration of Address Bus

Figure 2:
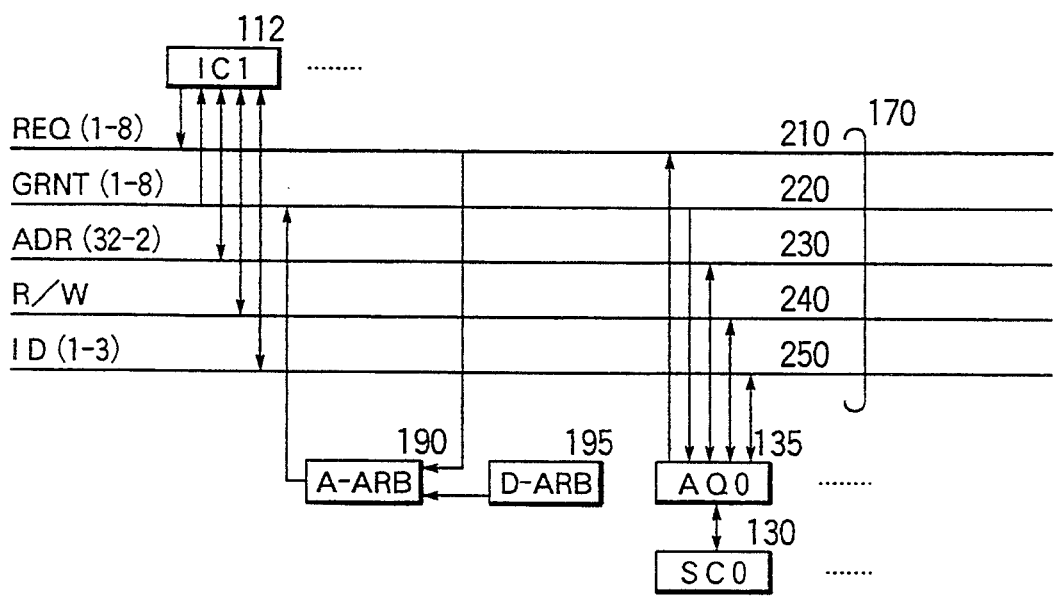
FIG. 2 is a detailed view showing the configuration of the address bus 170 depicted in FIG. 1.

FIG. 2 is a view for explaining in detail the configuration of the address bus 170 depicted in FIG. 1.

The address bus 170 has request signal lines 210, grant signal lines 220, address signal lines 230, read/write signal lines 240, and ID number signal lines 250.

Although no constituent member except the instruction cache IC1 112 and the memory bank SC0 130 is described in FIG. 2, it is obvious from FIG. 1 that the other instruction cache IC2 122, the operand caches OC1 113 and OC2 123 and the other memory banks SC1 140, SC2 150 and SC3 160 are connected similarly.

Eight request signal lines 210 and eight grant signal lines 220 correspond to the following devices: the instruction caches IC1 112 and IC2 122, the operand caches OC1 113 and OC2 123 and the memory banks SC0 130, SC1 140, SC2 150 and SC3 160. That is, the respective signal lines 210 and 220 have one-to-one correspondence to the aforementioned devices.

The ID number signal lines 250 are constituted by three signal lines to identify the aforementioned eight devices.

The operations of the respective constituent members will be described hereunder in the case where the instruction cache IC1 112 reads data existing in the memory bank SC0 130.

The instruction cache IC1 112 asserts one signal line corresponding to the instruction cache IC1 112 among the eight request signal lines 210 in order to acquire the ownership of the address bus 170.

After assertion of a corresponding one of the request signal lines, the instruction cache IC1 112 monitors the signal line corresponding to itself among the grant signal lines 220 and waits for the bus ownership to be given by the address-bus arbiter 190.

The address-bus arbiter 190 checks all (eight) of the request signal lines 210 to thereby give the bus ownership to the device requesting the bus ownership in the order of priority. It is now assumed that the ownership becomes allowable to be given to the instruction cache IC1 112. The address-bus arbiter 190 asserts one signal line corresponding to the instruction cache IC1 112 among the eight grant signal lines 220 and gives the bus ownership thereto.

If the signal line corresponding to the instruction cache IC1 112 itself is asserted among the grant signal lines 220, the instruction cache IC1 112 acquires the bus ownership and sends predetermined values to the address signal lines 230, the read/write signal lines 240 and the ID number signal lines 250. Here, the ID number of the instruction cache IC1 112 is outputted to the ID number signal lines 250.

The access queue 135 for the memory bank SC0 130 judges the access to the memory bank SC0 130 by the lower two bits of the address signal lines 230 and latches the contents of the address signal lines 230, the read/write signal lines 240 and the ID number signal lines 250. The access request thus latched by the access queue 135 is processed when the access to the memory bank SC0 130 is enabled.

Configuration of Data Bus

Figure 3:
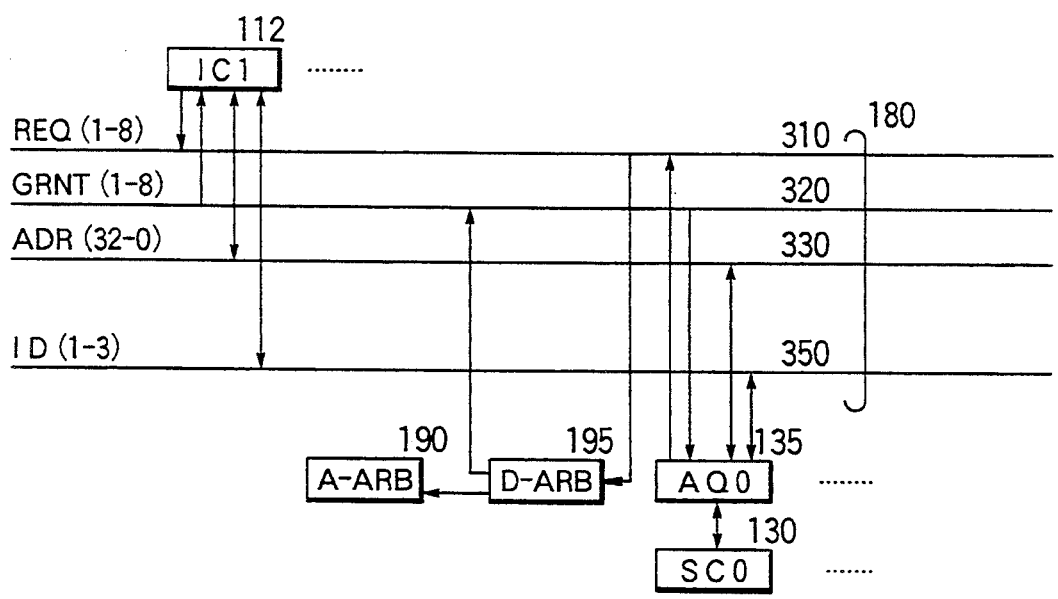
FIG. 3 is a detailed view showing the configuration of the data bus 180 depicted in FIG. 1.

FIG. 3 is a view for explaining in detail the configuration of the data bus 180 depicted in FIG. 1.

The data bus 180 has request signal lines 310, grant signal lines 320, data signal lines 330 and ID number signal lines 350.

Although no constituent member except the instruction cache IC1 112 and the memory bank SC0 130 is described in FIG. 3, it is obvious from FIG. 1 that the other instruction cache 122, the operand caches 113 and 123 and the other memory banks 140, 150 and 160 are connected similarly.

Eight request signal lines 310 and eight grant signal lines 320 correspond to the following devices: the instruction caches IC1 112 and IC2 122, the operand caches OC1 113 and OC2 123 and the memory banks SC0 130, SC1 140, SC2 150 and SC3 160. That is, the respective signal lines 310 and 320 have one-to-one correspondence to the aforementioned devices.

The ID number signal lines 350 of the data bus 180 are constituted by three signal lines in the same manner as the ID number signal lines 250 of the address bus 170.

The operations of the respective constituent members will be described hereunder in the case where the data read from the memory bank SC0 130 is transferred to the instruction cache IC1 112 according to a request of the instruction cache IC1 112.

The memory bank SC0 130 asserts one signal line corresponding to the memory bank SC0 130 among the eight request signal lines 310 in order to acquire the ownership of the data bus 180.

After assertion of one corresponding signal line among the request signal lines 310, the memory bank SC0 130 monitors a signal line corresponding to itself among the grant signal lines 320 and waits for the bus ownership to be given by the data-bus arbiter 195.

The data-bus arbiter 195 checks all (eight) of the request signal lines 310 to thereby give the bus ownership to the device requesting the bus ownership in the order of priority. It is now assumed that the ownership becomes allowable to be given to the memory bank SC0 130. The data-bus arbiter 195 asserts one signal line corresponding to the memory bank SC0 130 among the eight grant signal lines 320 and gives the bus ownership thereto.

If the signal line corresponding to the memory bank SC0 130 itself is asserted among the grant signal lines 320, the memory bank SC0 130 acquires the bus ownership and sends predetermined values to the data signal lines 330 and the ID number signal lines 350. Here, the ID number of the instruction cache IC1 112 as an access requester latched by the access queue 135 is outputted to the ID number signal lines 350.

On the other hand, the instruction cache IC1 112 releases the address bus 170 after the sending of the address, monitors the ID number signal lines 350 of the data bus 180, and waits for the read data to be transferred thereto from the memory bank SC0 130. Therefore, the instruction cache IC1 112 detects the ID number sent from the memory bank SC0 130, recognizes the answer cycle to the instruction cache IC1 112, and latches the data on the data signal lines.

Configuration of Access Queues

Figure 4:
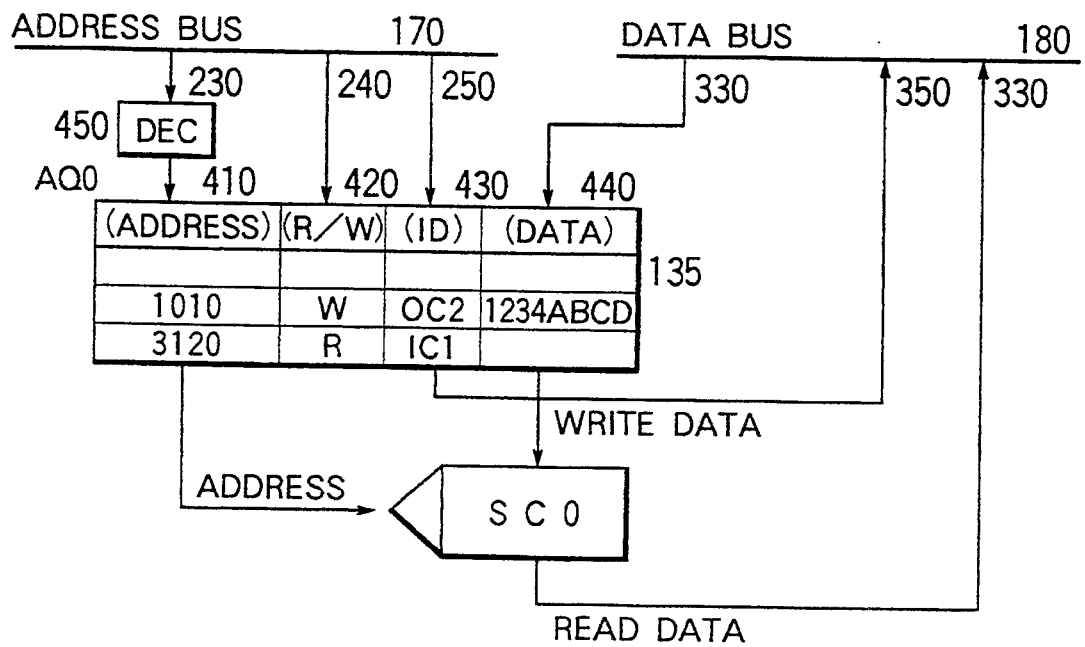
FIG. 4 is a detailed view showing the configuration of the access queue 135 depicted in FIG. 1.

FIG. 4 is a detailed view for explaining the configuration of the access queues depicted in FIG. 1. One access queue AQ0 135 is shown in detail in FIG. 4. The configuration in each of the other access queues AQ1 145, AQ2 155 and AQ3 165 is the same as that of the access queue AQ0 135.

The access queue 135 is a four-entry first-in first-out (FIFO) buffer. Each entry is constituted by an address section 410, a read/write section 420, an ID number section 430 and a write data section 440. The address section 410 latches the contents of the address signal lines 230 of the address bus 170. The read/write section 420 similarly latches the contents of the read/write signal lines 240. The ID number section 430 latches the contents of the ID number signal lines 250. The write data section 440 latches the contents (write data) of the data signal lines 330 of the data bus 180 at the time of the writing of data in the memory.

The memory access request from a device such as the instruction cache IC1 112 to the memory bank SC0 130 is once latched by the access queue 135. Accordingly, the address bus 170 can be released for the other devices without writing for the read data to be transferred from the memory bank SC0 130.

Even if an access request to the same memory bank is issued from another device when a memory access request with respect to one device is processed, the request of the access to the same memory bank from the other device can be buffered in the access queue because the access queue has a plurality of entries.

In this embodiment, memory access requests are issued from the following four devices: the instruction cache IC1 112 and the operand cache OC1 113 in the processor element 110 and the instruction cache IC2 122 and the operand cache OC2 123 in the processor element 120. It is sufficient that the number of buffer stages in the access queue is four, because a plurality of access requests are not issued at once from one device (because no succeeding access request is issued before a preceding access request is finished).

The present invention is however applicable to the case where a plurality of access requests are issued at once from one device. That is, the invention can be applied to this case by increasing the number of buffer stages in the access queue and providing means for identifying access requests issued at the same device.

The access requests latched by the access queue 135 are successively processed in order as latched on the basis of the characteristic of the first-in first-out (FIFO) buffer.

The address decoder 450 decodes the lower two bits of the address signal lines 230 of the address bus 170, judges the target bank of the access request among the memory banks SC0 130, SC1 140, SC2 150 and SC3 160, and makes an access queue corresponding to the target memory bank latch the access request. For example, the address decoder 450 makes the access queue 135 latch the access request when the lower two bits of the address signal lines 230 of the address bus 170 are "00".

Data Fetch into Device

Figure 5:
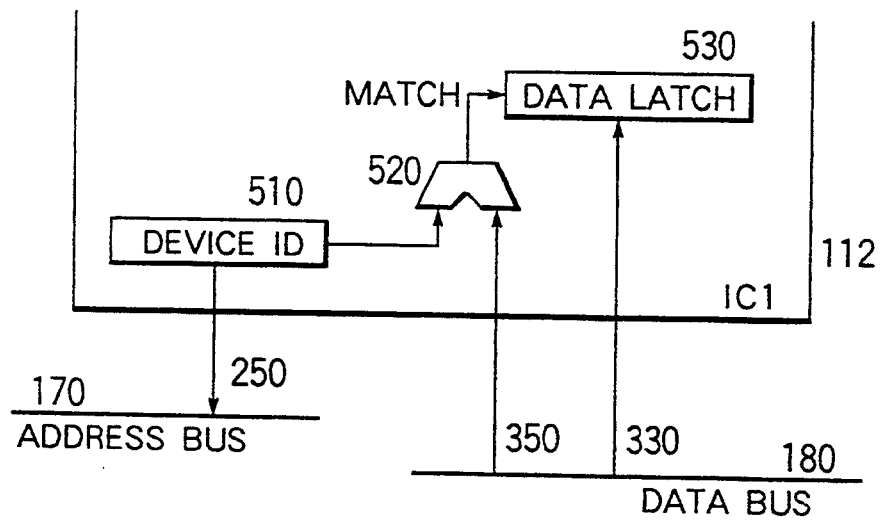
FIG. 5 is a detailed view showing the configuration of the instruction cache IC1 112 depicted in FIG. 1.

FIG. 5 shows the condition that a device issuing a memory read request fetches read data.

In FIG. 5, the instruction cache IC1 112 issues a read request and fetches read data.

The instruction cache IC1 112 has a device ID number register 510, an ID number comparator 520, and a data latch 530. Numbers peculiar to the respective devices are set to the device ID number register 510 in advance and are registered therein.

When the instruction cache IC1 112 acquires the address bus and sends out the access address, the instruction cache IC1 112 outputs the contents of the device ID number register 510 to the ID number signal lines 250 of the address bus 170. Then, the instruction cache IC1 112 releases the address bus for other devices and monitors the ID number signal lines 350 of the data bus 180. That is, the instruction cache IC1 112 compares the contents of the ID number signal lines 350 of the data bus 180 with the ID number (the contents of the ID number register 510) of the instruction cache itself through the comparator 520. When the two contents coincide with each other as a result of the comparison, the contents of the data signal lines 330 of the data bus 180 is latched into the data latch 530. The instruction cache IC1 112 transfers the contents of the data latch 530 to the CPU1 111 and, at the same time, stores the contents thereof in the cache memory.

Configuration of Bus Arbiter

Figure 6:
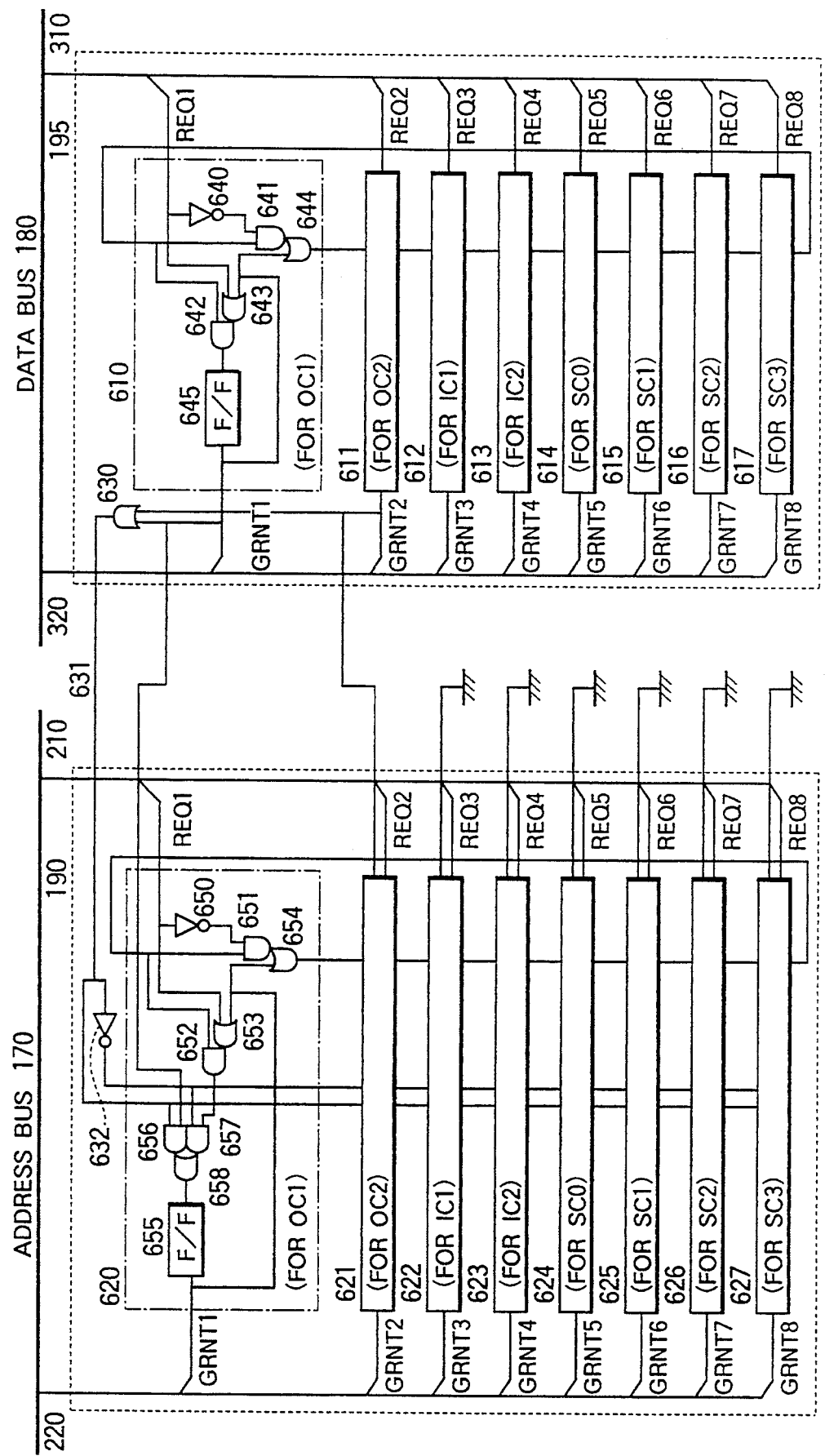
FIG. 6 is a detailed view showing the configuration of the bus arbiters 190 and 195 depicted in FIG. 1.

FIG. 6 is a view for explaining in detail the configuration of the arbiters 190 and 195 depicted in FIG. 1.

The data-bus arbiter 195 is an arbitration circuit for deciding the ownership of the data bus and is constituted by eight circuit blocks 610 to 617 corresponding to the respective devices and an OR gate 630.

The circuit blocks 610 to 617 have one-to-one correspondence to the request signal lines 310 and the grant signal lines 320 in the data bus 180. That is, the circuit blocks 610 and 611 correspond to the operand caches OC1 113 and OC2 123, respectively. The circuit blocks 612 and 613 correspond to the instruction caches IC1 112 and IC2 122, respectively. The circuit blocks 614 to 617 correspond to the memory banks SC0 130 to SC3 160, respectively.

The circuit blocks 610 to 617 have the same internal structure with each other. Accordingly, the internal structure of the circuit block 610 will be described hereunder as a representative example. The circuit block 610 is composed of an inverter 640, AND gates 641 and 642, OR gates 643 and 644 and a flip-flop 645 which are connected as shown in FIG. 6. It is now assumed that the flip-flop 645 has a value of "1" set for one circuit block and values of "0" set for the other circuit blocks.

The operation of the data-bus arbiter 195 will be described hereunder. It is now assumed that the memory banks SC2 150 and SC3 160 request the bus ownership through the request signal lines 310 after the bus ownership was given to the memory bank SC0 130 in the just previous cycle. The data-bus arbiter 195 decides to give the bus ownership to the memory bank SC2 150 on the basis of the operations of the circuit blocks 610 to 617 and outputs the decision to the grant signal lines 320.

According to the data-bus arbiter 195, the bus ownership deciding method is a method in which in a closed loop of the circuit blocks 610 to 617 the bus ownership is given to a request device first found by starting the search of the request signal lines from the device having the bus ownership in the just previous cycle.

According to this deciding method, the long time occupation of the bus by one device is prevented, so that a bus arbiter for giving the bus ownership to the respective devices in uniform probability can be provided.

One of the request signal lines of the data bus from the operand caches OC1 113 and OC2 123 is asserted when an operand data is stored.

The OR gate 630 serves to generate a signal 631 for synchronizing the arbitration of the address bus 170 with the arbitration of the data bus 180 when the operand data from the operand cache OC1 113 or OC2 123 is stored.

The address-bus arbiter 190 is an arbitration circuit for deciding the ownership of the address bus and is constituted by eight circuit blocks 620 to 627 corresponding to the respective devices and an inverter 632.

The circuit blocks 620 to 627 have one-to-one correspondence to the request signal lines 210 and the grant signal lines 220 in the address bus 170. That is, the circuit blocks 620 and 621 correspond to the operand caches OC1 113 and OC2 123, respectively. The circuit blocks 622 and 623 correspond to the instruction caches IC1 112 and IC2 122, respectively. The circuit blocks 624 to 627 correspond to the memory banks SC0 130 to SC3 160, respectively.

The circuit blocks 620 to 627 have the same internal structure with each other. Accordingly, the internal structure of the circuit block 620 will be described hereunder as a representative example. The circuit block 620 is composed of an inverter 650, AND gates 651, 652, 656 and 657, OR gates 653, 654 and 658 and a flip-flop 655 which are connected as shown in FIG. 6. It is now assumed that the flip-flop 655 has a value of "1" set for one circuit block and values of "0" set for the other circuit blocks.

The operation of the address-bus arbiter 190 is the same as the operation of the data-bus arbiter 195 when the signal 631 is "0" (that is, when the operand data from the operand cache OC1 113 or OC2 123 is not requested to be stored). That is, the bus ownership deciding method attained in the bus arbiter 190 is a method in which the bus ownership is given to a request device first found by starting the search of the request signal lines from the device having the bus ownership in the just previous cycle in the closed loop of the circuit blocks 620 to 627.

According to this deciding method, the occupation of the bus by one device is prevented, so that a bus arbiter for giving the bus ownership to the respective devices in uniform probability can be provided.

When, on the contrary, the signal 631 is "1" (that is, when the operand data from the operand cache OC1 113 or OC2 123 is requested to be stored), the output (the contents of the grant signal lines of the data bus 180) from the data-bus arbiter 195 is set to the flip-flop 655 in the circuit blocks 620 to 627 by the operations of the AND gates 656 and 657 and the OR gate 658 in the circuit blocks 620 to 627 and of the inverter 632, so that the contents thereof is outputted to the grant signal lines 220 of the address bus 170.

That is, the arbitration of the address bus 170 is synchronized with the arbitration of the data bus 180.

Operation of the Multiprocessor System

Figure 7:
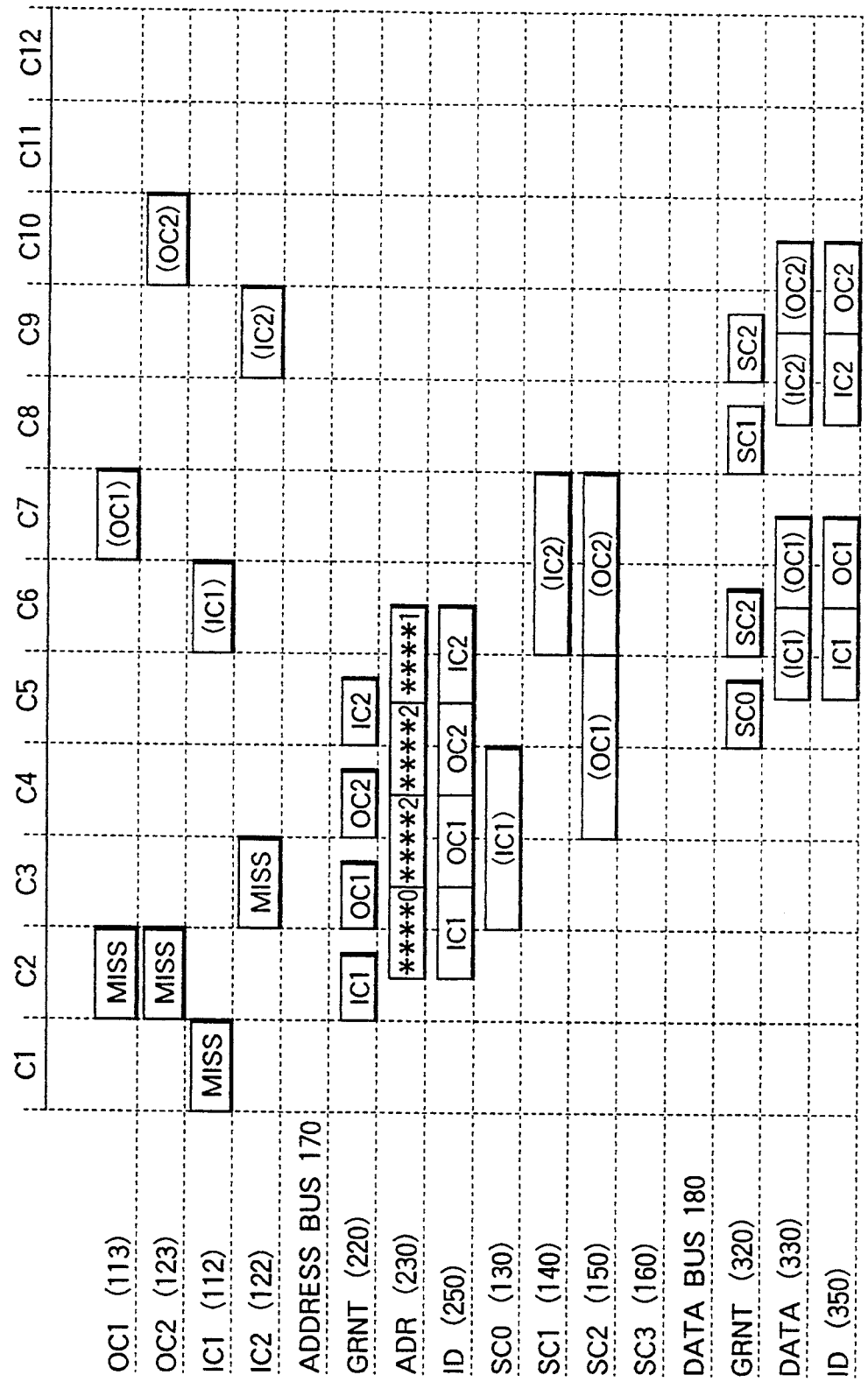
FIG. 7 is a time chart showing the operation of the multiprocessor system in the embodiment shown in FIGS. 1 through 6.

FIG. 7 is a time chart showing the operation of the multiprocessor system in the embodiment shown in FIGS. 1 through 6.

When it is found in the cycle C1 that a desired data is non-existent (missing) in the instruction cache IC1 112, the instruction cache IC1 112 asserts a request signal line 210 and requests the ownership of the address bus 170.

In the cycle C2, the address bus arbiter 190 asserts a grant signal line 220 and gives the bus ownership to the instruction cache IC1 112, because no device except the instruction cache IC1 112 requests the ownership of the address bus 170. Upon reception of the grant signal line 220, the instruction cache IC1 112 outputs signals to the address signal line 230 and the ID number signal line 250.

In the cycle C3, the memory bank SC0 130 detects that the memory bank SC0 130 is accessed on the basis of the lower two bits of the address signal line 230 and reads out data from the memory bank SC0 130.

In the cycle C4, the data bank SC0 130 asserts a signal in the request signal lines 310 to transfer a read data and requests the ownership of the data bus 180.

In the cycle C5, the data-bus arbiter 195 asserts a grant signal line 320 and gives the bus ownership to the memory bank SC0 130 because no device except the memory bank SC0 130 requires the ownership of the data bus 180 in this cycle. The memory bank SC0 130 receives the grant signal line 320 and transmits respective signals to the data signal lines 330 and the ID number signal lines 350. Here, the ID number of the instruction cache IC1 112 is outputted to the ID number signal lines 350.

In the cycle C6, the instruction cache IC1 112 recognizes, by the ID number signal lines 350, that the data accessed by itself is transferred and the instruction cache IC1 112 latches the contents of the data signal lines 330.

In parallel to a series of procedure from the cycle C1 to the cycle C6, the operand caches OC1 113 and OC2 123 request the address bus 170 in the cycle C2 simultaneously. The request by the operand cache OC1 113 is processed in the cycle C3 by the operation of the address-bus arbiter 190 before the request by the operand cache OC2 123 is processed in the next cycle C4.

Even if requests of the access to the memory bank SC2 150 are continuous in the cycles C5 and C6, the requests are buffered by the operation of the access queue 155 and processed successively.

Even if the memory banks SC1 140 and SC2 150 request the data bus 180 in the cycle C8 simultaneously, the request by the memory bank SC1 140 is processed in the cycle C8 by the operation of the data-bus arbiter 195 before the request by the memory bank SC2 150 is processed in the next cycle C9.

According to this embodiment, not only the maloperation caused by the concentration of access to one bank can be prevented by the operation of the memory and access buffer divided into four banks, but also the access to another bank can be executed regardless of waiting caused by the concentration of access to one bank. In short, according to the shared bus control system of this embodiment, the memory divided into four memory banks can be used effectively.

It is a matter of course that the present invention is not limited to the aforementioned embodiment and that various modifications thereof may be made without departing from the spirit thereof.

Figure 8:
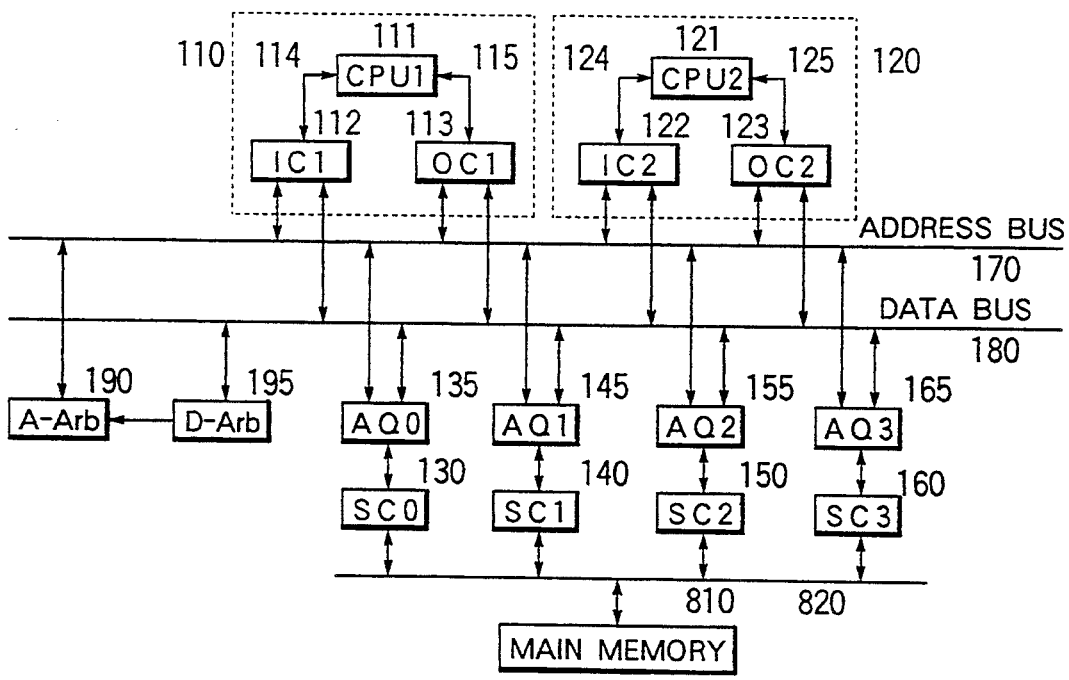
FIG. 8 is a block diagram showing the configuration of a multiprocessor system as another embodiment of the present invention.

Although the aforementioned embodiment has shown the case where the shared memory banks 130 to 160 are constituted by simple storage elements (for example, main memories), the present invention can be applied as another embodiment to the case where the shared memory banks 130 to 160 are constituted by cache memories. FIG. 8 is a block diagram of the multiprocessor system as the other embodiment of the invention.

The memory banks SC0 130, SC1 140, SC2 150 and SC3 160 are constituted by cache memories for storing the copy of the main memory 810. The cache memory banks SC0 130, SC1 140, SC2 150 and SC3 160 are connected to the main memory 810 through a second shared bus 820.

Although above description has not been made upon the form of the mounting of the processor system, all the circuit portions except the main memory 810 in the system of FIG. 1 or in the system of FIG. 8 may be provided on one semiconductor substrate by using the recent ULSI technology.

The aforementioned embodiment of the present invention has the following advantages.

Because an arbiter circuit used to decide the ownership of the data bus is provided, not only the user of the data bus can be decided independently of the address bus but also read data can be transferred by using only the data bus independently of the address bus.

Because the ID number of each device for shared bus access is assigned in advance, the ID number is outputted simultaneously with the sending of the address so that the confusion caused by buffering of a plurality of access requests on the memory side can be presented.

Because the memory is divided into a plurality of banks, requests of access to different memory banks can be processed in parallel.

Because the contents of the address bus are latched by an access queue after the sending of the address, the address bus can be released so that a new access of another device to the bus can be started without waiting for data response.

The present invention has the following effects.

According to the present invention, because the shared memory is divided into a plurality of banks and because a separate bus system in which an address bus and a data bus are physically separated from each other is employed, the throughput in access from a plurality of processors to the shared memory divided into the plurality of banks can be improved greatly.

Further, because data transfers between the shared memory banks and the processors are successively executed after the ownership of the data bus is acquired by first-in first-out means with respect to a plurality of shared memory access request addresses buffered in the FIFO memory, a succeeding access request need not wait for the data transfer by a preceding access request to be finished even if these two access requests are addressed simultaneously to one bank of the shared memory. Accordingly, the throughput of the system as to access to one memory bank can be improved greatly.

What is claimed is:

1. A multiprocessor system comprising:
   an address bus;
   a data bus;
   a plurality of processors each of which is connected to both said address bus and said data bus and each of which sends an access-request address to said address bus, each of the plurality of processors including i) storing means for storing a processor identification number distinct between each of the plurality of processors and ii) first sending means for sending said processor identification number and an access request read/write signal to said data bus when sending said access-request address to said address bus;
   a plurality of access queues each of which is connected to both said address bus and said data bus, each of the plurality of access queues including a first-in first-out memory each including buffering means for buffering i) a plurality of said access-request addresses, ii) a plurality of said access request read/write signals, iii) a plurality of said processor identification numbers sent from said plurality of processors to said address bus and iv) write data of write access-requests sent from at least one of said plurality of processors to said data bus;
   a shared memory divided into a plurality of shared memory banks, each of the plurality of shared memory banks respectively corresponding to a one of said plurality of access queues;
   a plurality of second sending means, each of which being included in the first-in first-out memory of each of plurality of access queues, for sending said plurality of said access-request addresses and said write data of said write access-request from said buffering means to a corresponding one of said plurality of said shared memory banks;

a plurality of third sending means, each of which being included in the first-in first-out memory of each of the plurality of access queues, for sending a buffered processor identification number to said data bus when said corresponding one of said plurality of banks of said shared memory sends requested data to said data bus in response to a one of said plurality of said access-request addresses; and, a plurality of comparing means, each of which being included in a one of said plurality of processors, for comparing said buffered processor identification number sent to said data bus from said first-in first-out memory of at least one of said plurality of access queues with said processor identification numbers stored in said storing means and generating an instruction to fetch data on said data bus into a corresponding processor when the comparing of the processor identification numbers detects a coincidence therebetween.

2. The multiprocessor system according to claim 1, wherein said system further comprises a first arbiter which is connected to said address bus for deciding address bus ownership in response to the request on said address bus, and a second arbiter which is connected to said data bus for deciding data bus ownership in response to the request on said data bus.

3. The multiprocessor system according to claim 1, wherein said shared memory is a cache memory.

4. The multiprocessor system according to claim 3, wherein said address bus, said data bus, said plurality of access queues and said cache memory are formed on a single semiconductor substrate.

* * * * *